(12) United States Patent
Fouladi (10) Patent No.: US 12,346,163 B2
(45) Date of Patent: Jul. 1, 2025

(54) EDUCATIONAL DEVICE, METHODS AND SYSTEMS

(71) Applicant: JARA WORLDWIDE, San Francisco, CA (US)

(72) Inventor: Soraya Fouladi, San Francisco, CA (US)

(73) Assignee: Jara Worldwide, San Francisco, CA (US)

( * ) Notice: Subject to any disclaimer, the term of this patent is extended or adjusted under 35 U.S.C. 154(b) by 30 days.

(21) Appl. No.: 17/830,177

(22) Filed: Jun. 1, 2022

(65) Prior Publication Data

US 2023/0125060 A1   Apr. 20, 2023

Related U.S. Application Data

(63) Continuation of application No. PCT/US2020/063392, filed on Dec. 4, 2020.

(60) Provisional application No. 62/944,237, filed on Dec. 5, 2019.

(51) Int. Cl.
| | |
|---|---|
| *G06F 1/16* | (2006.01) |
| *G06F 1/20* | (2006.01) |
| *G09B 5/02* | (2006.01) |
| *H02J 7/32* | (2006.01) |

(52) U.S. Cl.
CPC .......... *G06F 1/1635* (2013.01); *G06F 1/1626* (2013.01); *G06F 1/206* (2013.01); *G09B 5/02* (2013.01); *H02J 7/32* (2013.01)

(58) Field of Classification Search
None
See application file for complete search history.

(56) References Cited

U.S. PATENT DOCUMENTS

| | | | |
|---|---|---|---|
| 4,907,183 A | 3/1990 | Tanaka | |
| 5,103,156 A | 4/1992 | Jones et al. | |
| 5,630,155 A | 5/1997 | Karaki et al. | |
| 7,019,492 B1 | 3/2006 | Baker et al. | |
| 7,239,237 B2 | 7/2007 | Hess | |
| 9,479,212 B1 | 10/2016 | Garcia | |
| 9,888,337 B1 * | 2/2018 | Zalewski | ........... G06Q 30/0635 |
| 2010/0124948 A1 * | 5/2010 | Johnston | ............. H02K 7/1892 |
| | | | 455/569.1 |
| 2010/0315249 A1 | 12/2010 | Imai | |

FOREIGN PATENT DOCUMENTS

WO   WO-2021113699 A1   6/2021

OTHER PUBLICATIONS

'Battery and power' (OLPC), Mar. 25, 2019 (Mar. 25, 2019), [online], retrieved from url: https://web.archive.org/web/20190325013419/ http://wikllaptop.org/go/Battery_and_power /url:r, entire document.

(Continued)

*Primary Examiner* — Stephen T. Reed
(74) *Attorney, Agent, or Firm* — Wilson Sonsini Goodrich & Rosati (57) ABSTRACT

The present disclosure provides devices, methods and systems for enabling low cost, high quality education in under-resourced regions such as post disaster areas. The devices provided herein may be charged and used without the need of sustainable power resources or access to internet at all times.

13 Claims, 10 Drawing Sheets

(56) References Cited

OTHER PUBLICATIONS

Bernstein, J., 11 Handheld Game Systems That Time Forgot. BuzzFeedNews, https://www.buzzfeednews.com/article/josephbernstein/11-handheld-game-systems-that-time-forgot, Aug. 28, 2013.

Fouladi, Soraya, How IoT can Educate the 1 Billion Children in Poverty, Samsung Forum(Samsung Strategy & Innovation Center), Aug. 29, 2018 (Aug. 29, 2018), [online], retrieved from url: https://www.youtube.com/watch?v=_z1CXz9pe0A&feature=emb_logo , entire document/url:.

'FR-2' (Wikipedia), Apr. 15, 2019 (Apr. 15, 2019) [online], retrieved from <url: https://web.archive.org/web/20190415195445/ https://en.wikipedia.org/wiki/FR-2 , entire document.

Panic, Playdate, https://play.date/, accessed on Sep. 26, 2023.

PCT/US20/63392 International Search Report and Written Opinion dated Apr. 9, 2021.

Rahaman, M.A. et al., Portable Dual Mode Mobile Charger with Hand Crank Generator and Solar Panel. Indonesian Journal of Electrical Engineering and Computer Science 1(2):282-287 (Feb. 2016).

UNICEF, The State of the World's Children 2017, Children in a Digital World. United Nations Children's Fund (UNICEF), 215 pgs., (Dec. 2017).

Wabo, Cpl., 10 Best Hand Crank Phone Chargers (with USB Ports) My Top Picks. MarineApproved, https://www.marineapproved.com/hand-crank-phone-charger/#1_Red_Cross_Clipray_Cheapest, updated Apr. 24, 2023.

Wikipedia, Mechanically powered flashlight. Wikipedia The Free Encyclopedia, https://en.wikipedia.org/wiki/Mechanically_powered_flashlight, last edited Jul. 4, 2023.

* cited by examiner

EDUCATIONAL DEVICE, METHODS AND SYSTEMS

CROSS-REFERENCE

This application is a continuation of International Application No. PCT/US2020/063392, filed Dec. 4, 2020, which claims the benefit of U.S. Provisional Application No. 62/944,237, filed Dec. 5, 2019, each of which is incorporated herein by reference in its entirety for all purposes.

BACKGROUND

There have been efforts to provide education for under-developed areas as well as regions affected by natural disasters such as earthquake or flood. One of the major challenges in those regions is scarceness of resources such as power or internet access.

SUMMARY

The present disclosure provides devices, methods and systems for enabling low cost, high quality education in under-resourced regions such as post disaster areas. The devices provided herein may be charged and used without the need of sustainable power resources or access to the Internet at all times.

In an aspect, the present disclosures provides a device used for educational purposes. The device may comprise: a first energy source comprising a mechanical crank integrated into the device; a second energy source comprising a solar panel integrated into the device; a graphical display; a processor configured to be powered by the first energy source or the second energy source; and a plurality of push buttons configured to permit a user to interact with the device. In some embodiments, the crank may be engaged to charge a rechargeable battery of the device. In some embodiments, a notification on the graphical display may inform the user to engage the crank to charge the rechargeable battery.

In some embodiments, the device may further comprise a memory configured to store educational content, wherein the educational content is configured to be displayed on the graphical display.

In some embodiments, the device may further comprise a communication interface configured to update the memory of the device based upon Bluetooth communications.

In some embodiments, the device may further comprise multiple sides to which the mechanical crank may be attached to the device, based on a handedness of the user.

In some embodiments, the device may further comprise a visual indicator providing an indication of a level of charge of the rechargeable battery.

In some embodiments, the device may further comprise a power management unit configured to increase performance and reduce power consumption, based on voltage data from the battery.

In some embodiments, the device may further comprise a halting mechanism configured to prevent further charging of the battery while the mechanical crank is turned, when the level of charge passes a predetermined threshold.

In some embodiments, the device may further comprise a halting mechanism configured to prevent further charging of the battery, when a temperature of the device exceeds a predetermined threshold.

In some embodiments, the mechanical crank and the solar panel may be configured to provide energy to the battery simultaneously while the crank is turned.

In some embodiments, the mechanical crank may be configured to provide energy to the battery and the solar panel may not or need not be configured to provide energy to the battery while the crank is turned.

In some embodiments, the graphical display may be configured to show remaining operational time for the device, based upon the current state of charge of the battery.

In some embodiments, the processor may be implemented with aid of a printed circuit board formed from a flame resistant 2 material.

In some embodiments, the printed circuit board may be configured to be a heat sink for the device.

In another aspect, the present disclosure provides a method for assessment of context level. The method may comprise: receiving an educational device by a user; taking a plurality of tests; and using a machine learning algorithm to identify optimal content from the plurality of tests.

In some embodiments, the machine learning algorithm may identify the optimal content based on historical data.

In some embodiments, the machine learning algorithm may identify the optimal content based on simulated data.

In another aspect, the present disclosures provides a method for assessment of context. The method may comprise: receiving an educational device by a user, said educational device comprising a first energy source and a second energy source configured to provide energy to a rechargeable battery, and a graphical display configured to display educational content with aid of energy provided by the rechargeable battery; taking a plurality of tests; identifying a preferred presentation context for the user based on the plurality of tests; and providing educational content within the preferred presentation context.

In some embodiments, the preferred presentation context may be selected from a group comprising: visual learning context, audio learning context, and textual learning context.

In some embodiments, the preferred presentation context may be selected from a group comprising: a vertical orientation of the graphical display or a horizontal orientation of the graphical display.

In some embodiments, the preferred presentation context may be identified with aid of a machine learning algorithm.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and descriptions are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Devices, methods and systems described herein may provide a cost-efficient practical means for education in regions with limited access to resources such as established electric power and/or the Internet. The educational devices, systems, and methods provided herein may be able to function independently of utility systems, and/or wide area networks. The educational devices, systems, and methods provided herein may be capable of functioning on their own without outside communications or power. The devices provided herein, may utilize low cost electronics in the circuitry and may be built to endure extreme natural conditions such as high humidity, heat or dust. The housing of the devices may comprise material that can resist against extreme conditions such as extreme dust, heat, cold, humidity or breaking. The operational power for the device may be provided by a rechargeable battery. However, in some areas such as post disaster zones there may not be a reliable and sustainable access to electric power grids in order to charge the battery of the device. The systems and methods described herein, may suggest alternative solutions for providing energy for charging the battery of the device. These solutions may utilize renewable energies such as solar energy or wind energy or may utilize mechanical energy input to the device. In some instances, kinetic energy, provided manually by an individual may be used to provide power to the device.

Some non-limiting examples of alternative energy resources are as follows: Solar panels may be used an integrated part of the device or as separate panels from the device. Micro wind turbines may be used to provide energy for charging the battery of the device, the output of the wind turbine may be connected to the device through a slot or a serial port. Thermo-electric battery charger be used in some embodiment, using the heat energy. In some embodiments, a user may interact with the device to manually generate the energy needed for charging the battery of the device. The user may enable a mechanical component to produce mechanical energy for example by rotation of a handle or a crank or using strain energy by squeezing a piezoelectric ball and transferring the mechanical energy through for example a shaft to the device. The mechanical energy may then be converted to electrical energy used for charging the battery.

In some instances, a device may include multiple power generation systems. In some instances, at least one of the power generation systems may be passive, such as solar power. The solar panels may automatically provide power to the battery without requiring user input or action. In some instances at least one of the power generation systems may be active, such as a manual power generation component, such as a crank. The crank may require user input or action to provide power. The device may use a combination of passive and active power generation.

Systems and methods provided herein may enable the updating of the content on the device using communication protocols such as Bluetooth or Bluetooth low energy (BLE). Such protocols may reduce the need to have constant access to wide area network such as the Internet. These protocols may also enable the gathering of data from different devices to improve the content using machine learning techniques.

Figure 1A:
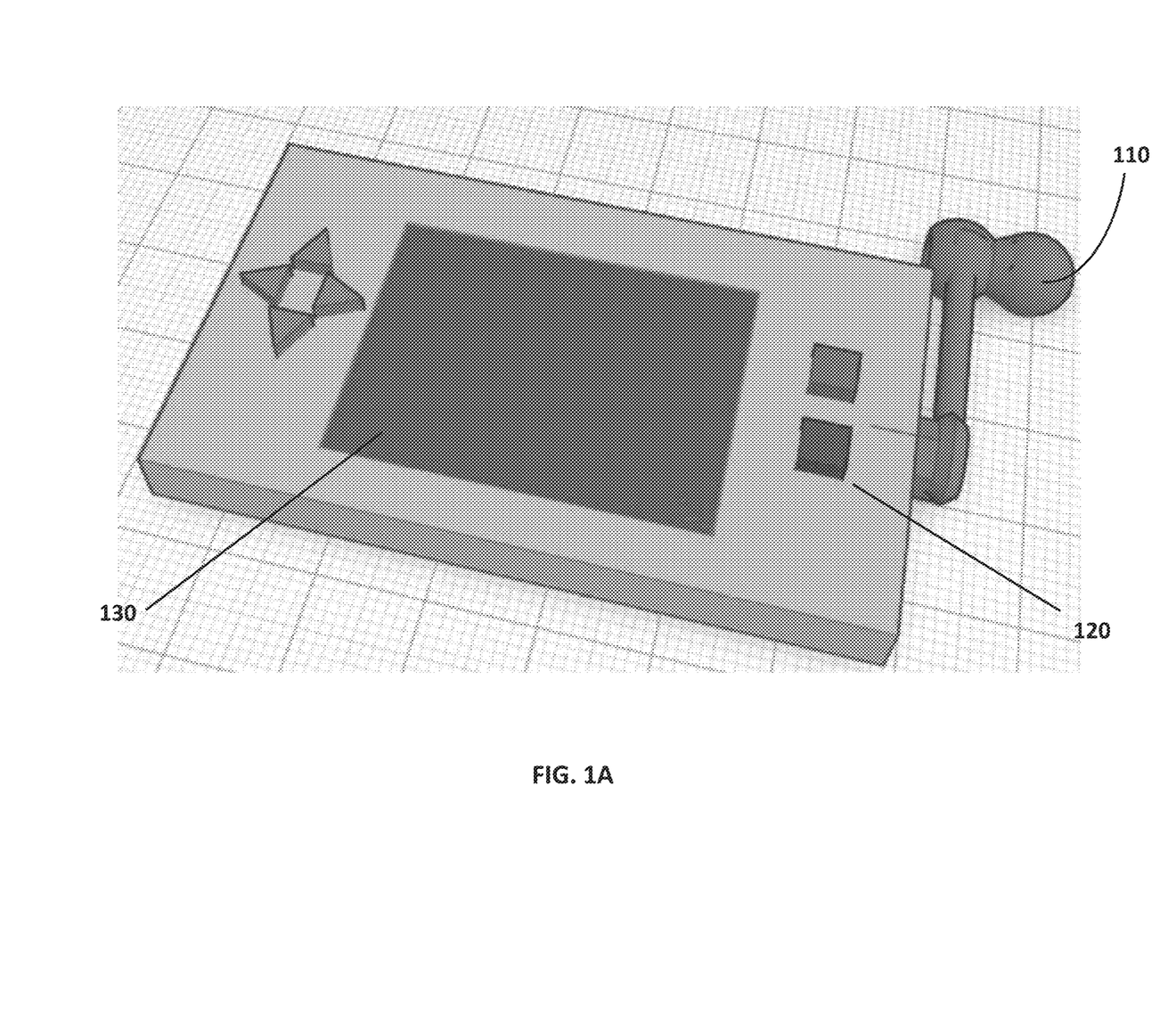
FIG. 1A illustrates an exemplary embodiment of the front view of an educational device.

FIG. 1A schematically shows the front view of a device as disclosed herein. The device may comprise a manual power generation component, such as a crank 110. The manual power generation component may receive manual input from an individual to provide power to the device. Movement by a user may be converted by the manual power generation component into electrical energy. In some embodiments, the crank is integrated into the device. The crank 110 may comprise a longitudinal shaft which may be connected to the device and the circuitry inside the device. The crank may further comprise a vertical shaft, an L-shaped handle or any other handle to facilitate the rotation of the crank. In some embodiments, the crank may comprise a cylinder without having any extra handles. The cylinder may be rotated to produce mechanical energy.

In some embodiments, rotation of the crank only in one direction may lead to generation of energy. For example, clockwise or counter clockwise. In some cases, there is no preference in the direction of rotation of the crank. In some instances, the rotation of the crank in multiple directions may lead to generation of energy. The crank may be fixed to the device or detachable from the device. In some embodiments, the crank may be temporarily attached to the device by inserting the longitudinal shaft into an insert or slot on the device or by latching the shaft into a shaft mechanism or by any other attaching mechanism. The crank may remain protruding from the device. In other instances, the crank may be foldable and/or change position to lie flush against or within a surface of the device.

The crank may be placed on either side of the device or on the top or bottom surface of the device. The crank may be placed on the front or back panel of the device. In some embodiments, the crank may be placed based on the handedness of the user. For example, if the user is right-handed, the crank may be placed on the right side of the device, and if the user is left-handed, the crank may be placed on the left side of the device. In some instances, a user may select the side for the crank to attach and attach the crank at a selected location from a plurality of available locations. The crank may be ergonomically designed for easy access and easy rotation. In the example of FIG. 1A, crank 110 is placed at the side of the educational device.

The user may charge the device by rotating the crank continuously for a duration of time. In some embodiments, an indicator light may be installed on the device. The indicator light may have different color lights for indicating different stages of the charge of the battery. For example, a red light may indicate critically low charge or below a predefined critical threshold. In that, the user may rotate the crank until the indicator changes color to for example yellow which may indicate a percentage charge which is above the critical threshold but still not fully charged or charged to the satisfactory threshold. The user may rotate the crank until the indicator light changes color to for example green which may be indicative of the charge being above a threshold or fully charged battery. In order to prevent adverse events such as overcharging of the battery a halting mechanism may strop the conversion of energy to electrical energy, even if the user continues to rotate the crank after the battery is fully charged. The user may rotate a crank for a duration of a few seconds, less than a minute or a few minutes, less than an hour or more than an hour.

Figure 1B:
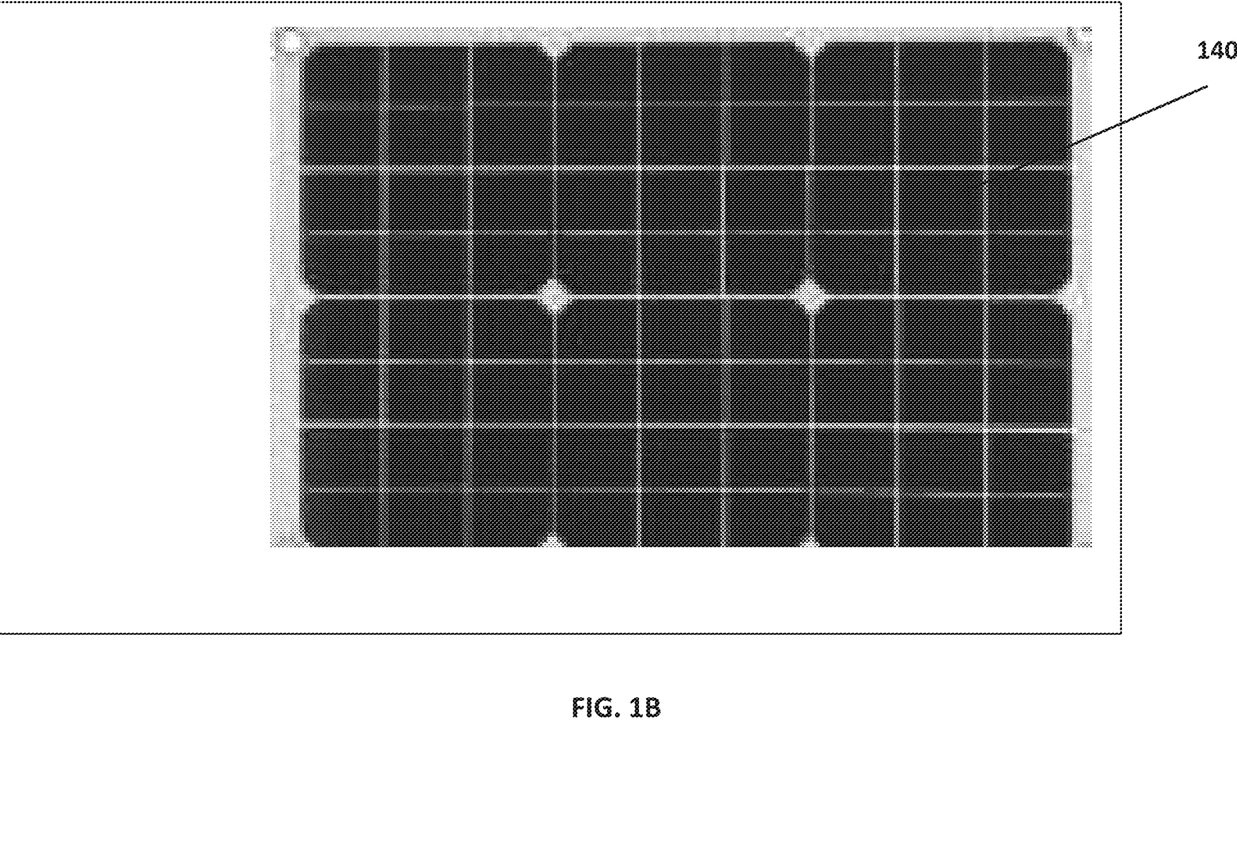
FIG. 1B illustrates an exemplary embodiment of the back panel of an educational device.

In some embodiments, the device may have additional charging mechanism such as a solar panel 140, as shown in the example of FIG. 1B. Any other renewable energy charging mechanism may be utilized in addition to, or in place of the solar panel. The solar panel may be integrated into the device. In some embodiments, the solar panel may be on the back surface of the device such as shown in the example of FIG. 1B. The solar panel can be on either side of the device. The solar panel may be on the top or bottom surface of the device or on the front of the device. The solar panel may be positioned to capture sunlight while the user is holding and/or using the device. In some embodiments, the solar panel may be covered with a protective transparent sheet to be protected from damage or breaking. The solar panel may be encased in a case or a housing. The device may be designed to withstand falls or being dropped. Similarly, the solar panels may be protected to be able to withstand falls or drops. The solar panels may have an exterior surface or be encased in an exterior surface that may be easy to clean, to allow efficient access to sunlight.

In some embodiments, there may a plurality of solar panels. In some embodiments, the solar panel may cover more than 10%, 20%, 30%, 40%, 50%, 60%, 70%, or 80% of the surface of the device. In other cases, the solar panel may cover less than 10%, 20%, 30%, 40%, 50%, 60%, 70%, or 80% of the surface of the device. In some cases, the solar panel can be attached to the device or detached from it. The solar panel may be attached to the device through a wire and a universal serial bus (USB) slot. The solar panel may be attached to the device via a connector that may allow the solar panel to fold and/or rotate relative to the device body. In some instances, the angle of the solar panel may remain fixed relative to the device body. Alternatively, the angle of the solar panel may vary relative to the device body and/or be adjustable to collect sunlight.

In some embodiments, the device may further comprise additional charging mechanisms such as an electric charger for the instances that electric grid connection is accessible or back up chargers such as thermo-electric chargers. However, the device may be capable of being fully charged and/or operational without requiring access to an electrical grid.

The device may either include or be connected to different types of user interface and input/output (I/O) devices such as keyboard, mouse, monitor, CD/DVD drive and/or external devices. The I/O devices may include buttons, sliders, trackballs, touchscreens, joysticks, screens, or other devices. In one example, the device may comprise a plurality of push buttons 120. The push buttons 120 may facilitate the operation of an onscreen keyboard as well as other functions. The device may also comprise a graphical display 130. The graphical display may be a black and white display or a color display. In some embodiments, the display may be a liquid crystal display (LCD), which may advantageously reduce power consummation and reduce the complexity of circuitry. In some embodiments, a transparent cover may be added to the screen to make it more durable against damage for example cracking or breaking. In some embodiments, the device may comprise a speaker. In some cases, the device may comprise a microphone. In some embodiments, the device may comprise an onboard camera or be capable of being connected to a camera such as a webcam.

The device may be formed from a durable material that may enable it to function after being dropped or banged against other objects. The device may comprise insultation or shock absorbing materials therein that may allow mechanical or electrical components to continue to function after a large force or impact on the device. The graphical display and/or solar panels may be shock resistant. One or more protective cover, feature, or shock absorbing material may be provided that may prevent the graphical display or solar panel from breaking or cracking.

Figure 2:
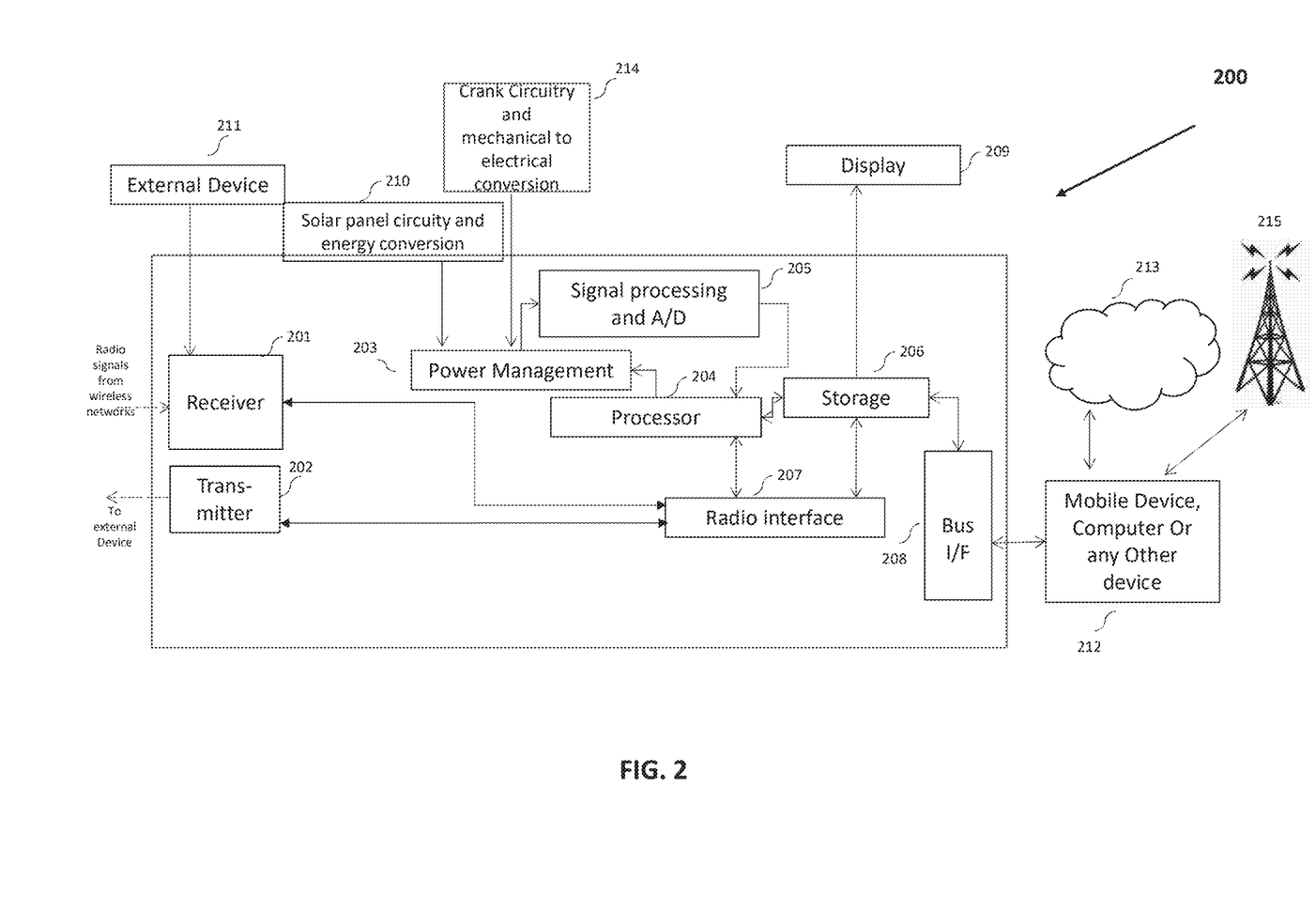
FIG. 2 shows a schematic representation of the circuitry of the device according to some embodiment.

FIG. 2 shows an example schematic of the device. In some embodiments, the printed circuit board (PCB) may be made of flame resistant 2 (FR2) material for cost efficiency. The PCB may then be filled with a material such as epoxy. The epoxy may act as thermal sink and/or make the PCB more durable. Other heat dissipation mechanism such as heat sinks may also be used to protect the device from overheating. In some instances, the heat sinks may comprise one or more fins. The heat sinks may be formed from a thermally conductive material, such as metals (e.g., aluminum, copper, aluminum alloys). In some embodiments, the housing of the device may include small openings or grooves that would allow the flow of air to the circuit and therefore for cooling the circuitry.

In some embodiments, the circuitry 200 comprises central processor 204, signal processing and A/D module 205, on-board power management unit 203, on-board data storage 206, and communication peripheries including but not limited to receiver 201 (which may be in communication with one or more external devices 211), transmitter 202, radio interface 207, I/F bus 208. The processor 204 may manage data and communication that allows both on-board data storage 206 and communication with remotely connected computing devices 212 and in some cases a server 213 such as a remote server or a cloud server. In some cases, data stored in the data storage 206 may be transmitted to or displayed on a display 209. The power consumption may be regulated by an on-board power management unit 203 to optimize performance and minimize power consumption. In some cases, the power management unit may be operatively coupled to solar power circuitry 210 and/or any other type of energy conversion system. In other cases, the power management unit may be operatively coupled to crank circuitry 214 and/or any other type of mechanical to electrical energy conversion systems. The power management unit may be configured to increase or improve performance while reducing power consumption. The power management unit may be configured to increase battery life of the device. For example, when the battery is fully charged, the device may be capable of actively operating for at least 30 hours, 25 hours, 20 hours, 15 hours, 10 hours, 8 hours, 5 hours, 4 hours, 3 hours, 2 hours, or 1 hour without further charging or intervention.

In some embodiments, the power management unit may receive the voltage data from the battery. The power management unit may regulate the charging of the battery by different charging mechanisms. For example, if during the charging of the battery by the solar panel or the crank or any other mechanism, the voltage of the battery reaches a threshold, the power management unit may send a signal to either of the charging mechanisms. The signal may halt further conversion of energy for further charging of the battery. If more than one charging mechanism is charging the battery at a given time, the power management unit may adjust to receive the energy from all the charging mechanisms.

The central processing unit may reconfigure its functionality based on available computation resources as well as communication networks. In some embodiments, when the central processing unit is interfaced with at least one mobile device, the data may be processed by on-board processor, cached by on-board storage, and finally transmitted to a mobile computing device 212 via I/F Bus 208 and subsequently cloud server 213 or a cell tower 215 for further analysis and data aggregation. Data such as data packages or software update packages may also be transferred from a cellular network 215 to the one or a plurality of mobile devices and transmitted to the device. The data may be transmitted to the device through a Bluetooth communication protocol. The radio communication periphery 207 in the device may comprise a Bluetooth low energy (BTLE) chip for wireless transmission of data.

Mobile computing devices include but are not limited to mobile devices, smart phones, and computer servers. If no mobile devices are available for transmitting and/or receiving data from the educational device, the data may be processed by an on-board processor 204 and stored in on-board storage 206, and downloaded later to a mobile computing device 212 via I/F Bus 208 or the Bluetooth connection when connection is established. Data packages at the cellular network 215 may also be transmitted to the educational device when a mobile device is available.

Figure 3:
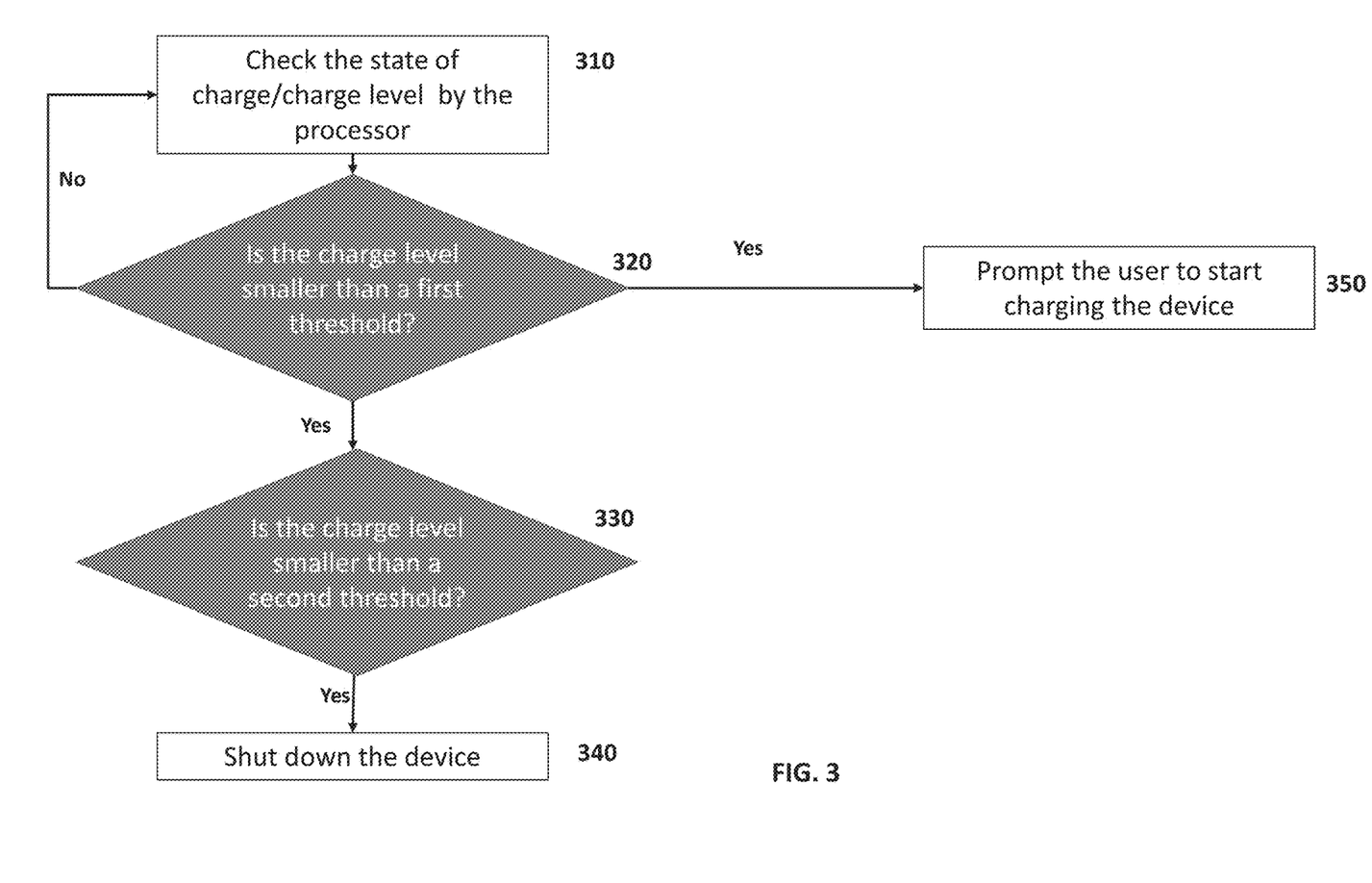
FIG. 3 shows an example workflow of a method of power management according to some embodiments.

FIG. 3 shows a method for power management. As the battery charge level drops, the battery voltage also drops. The battery output voltage can be used as a measure of the level of charge of battery. As described elsewhere, in some embodiments, the battery voltage output may be sent to a power management unit, such as a power management chip and sent to one or more processors for analyzing in a step 310. The voltage may be checked continuously or periodically or in time intervals dictated by the processor. The voltage may be checked every 1 second (sec), 5 sec, 10 sec, 50 sec, 1 minute (min), 10 min, 20 min, 30 min, 40 min, 50 min, 1 hour, 2 hours, 5 hours or any value in between. The voltage may be checked more frequent than one second.

In a step 320, the voltage is compared with a predefined first threshold. The first voltage threshold is equivalent to a first charge level threshold in the battery. If the device falls below the first threshold, the user may be prompted to charge the device by an indication 350. For instance, a visual indication on the graphical device may be provided (e.g., pop-up message). In some instances, an audio indication may be provided via speakers (e.g., a chime, verbal message, or sound to charge the device). Further examples of possible visual indication to guide a user through using the crank to charge the device are provided in greater detail elsewhere herein.

In some embodiments, if the voltage is below a first threshold, the voltage may then be compared with a second predefined threshold which is lower than the first threshold in a step 330. The second voltage threshold is equivalent to a second battery charge level which is smaller than the first charge level. If the battery voltage is below a second threshold, the device may shut down automatically 340 to prevent the complete depletion of the battery. In some embodiments, a message like a visual and/or audio indication may be shown on the graphical display to prompt user to turn the device off. In some cases, the device may shut down after a predefined wait time if no action is taken by the user.

In some cases, if the battery level of charge is below the first threshold, the second threshold, or a third threshold between the first and second thresholds, the device may enter a power-conservation mode. The device may still be operable but certain functions may be altered in order to save power. For example, the display may be dimmer.

Figure 4A:
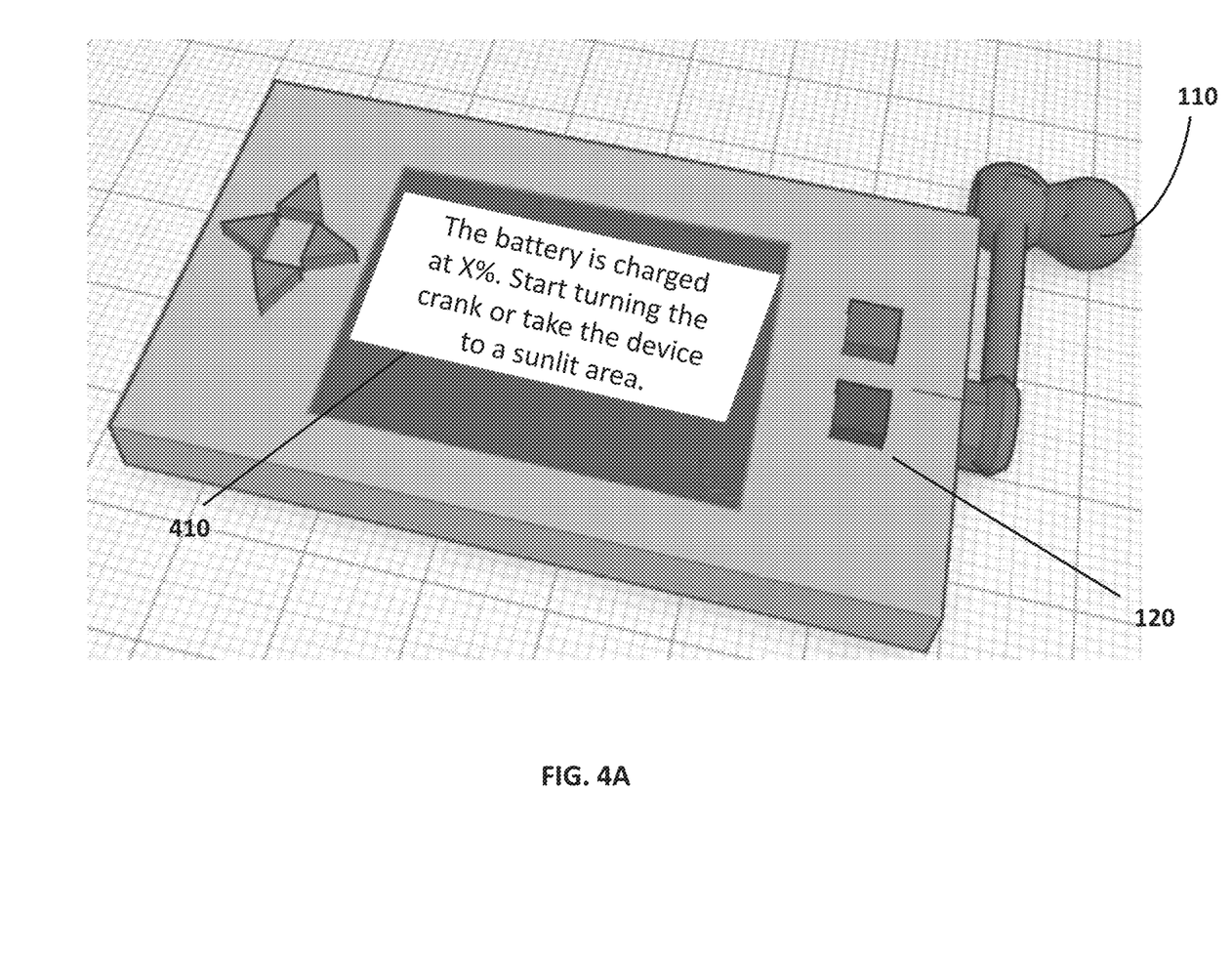
FIG. 4A and FIG. 4B show examples of power managements related messages on a graphical display according to some embodiments.

In some embodiments, a message 410 may be displayed on a user interface, prompting the user to charge the device for example by rotating the crank, such as shown in the example of FIG. 4A. As previously described, when the battery state of charge falls below a predefined threshold, an initial message may be sent to the user to engage the crank to charge the device. In some instances, the state of charge may or may not be displayed on the user interface. For example, the state of charge may be displayed as a percentage, or as a graphical visual image (e.g., showing a picture of a battery, etc.).

In some instances, one or more messages described herein may provide, alternatively to or in addition to a state of charge of the battery, the amount of estimated operational time for the device. In some instances, the state of charge and/or amount of remaining estimated operational time may be constantly shown on the device. For instance, if based on the state of charge and usage patterns, the device will operate for an additional 2 hours on the current charge, the user may see a message that indicates the remaining time. The amount of estimated operational time may be updated in substantially real time or periodically, or for any of the time periods described herein.

In some embodiments, if the rotational speed of the crank is below a threshold the energy conversion may not happen. In such case, an indication such as an audio and/or visual message on the graphical display may prompt user to rotate the crank faster.

In some embodiments, one charging mechanism may be preferred over other charging mechanisms. In such cases, a message may be displayed on the graphical display, specifying the preferred mechanism of charging. The user may be prompted to start charging using a specified charging mechanism. In some embodiments, the device may include sensors such as temperature or light sensors. If the device is placed in sunlit area, a message may display on the graphical display, prompting the user to direct the solar panel to the direction of the sunlight. In some embodiments, the user may place the side of the device containing the solar panel in a sunlit area for charging the device. In some embodiments, the solar panel and the turning of the crank may both convert energy simultaneously. In some cases, one mechanism either the crank engagement or the solar panel may convert the energy for the duration of charging.

Figure 4B:
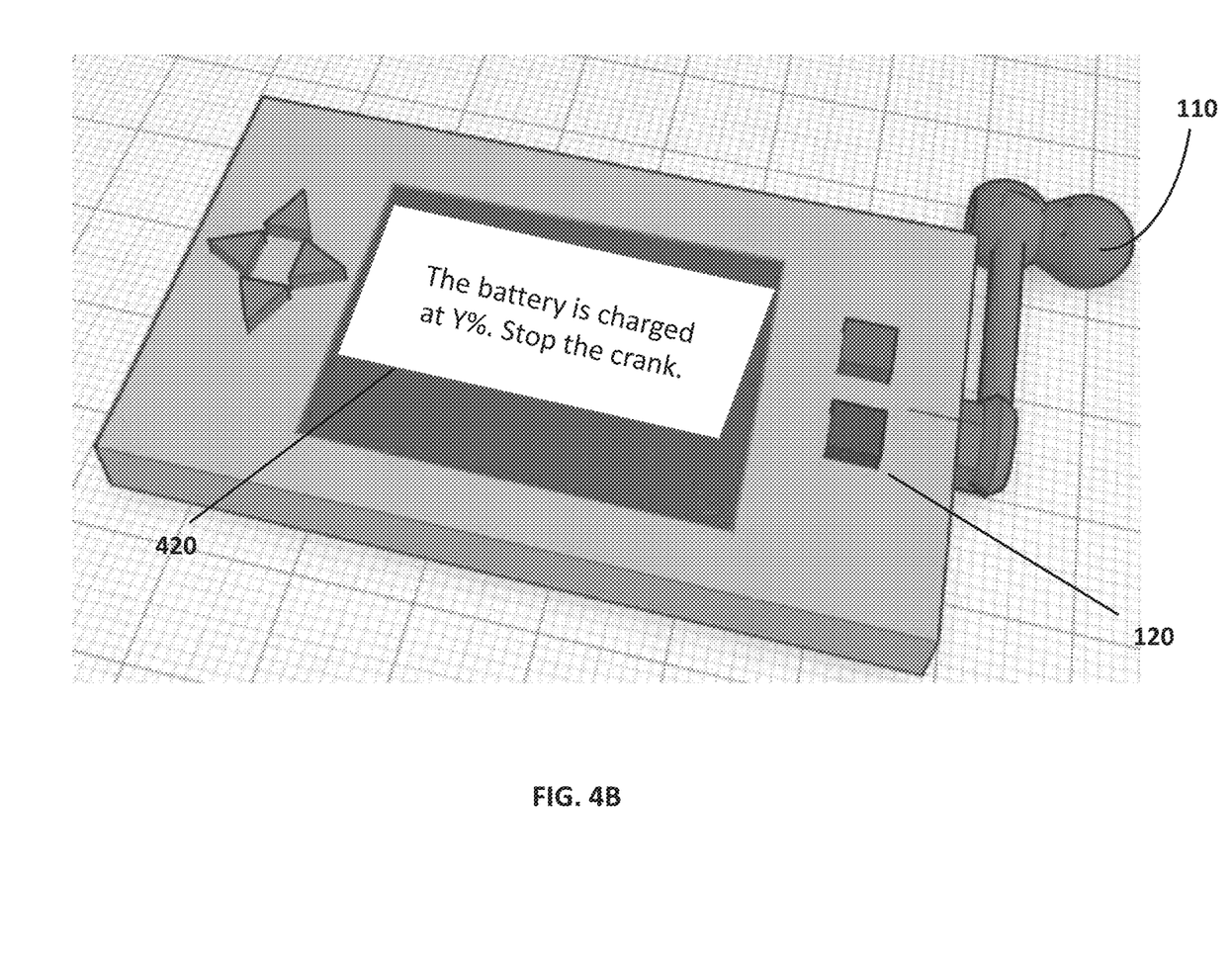

In some embodiments, if the output voltage of the battery during the turning of the crank, increases above a fourth predefined threshold, the user may be prompted to stop engaging or turning the crank. The fourth voltage threshold may be indicative of overcharging the battery or a charge of over 100%. A message 420 may be displayed on the user interface, prompting the user to stop charging the device such as shown in the example of FIG. 4B. In some instances, messages may be shown at different degrees of charge. For instance, if the user has reached a minimum threshold for charging with the crank, the user may be notified that the user may stop charging. In some instances, if the battery is at or nearing a full state of charge, the user may be instructed more clearly to stop charging.

In some embodiments, if a temperature sensor, senses a temperature above a predefined threshold, the user may be prompted to stop charging. In some cases, the conversion of energy and increasing the charge may be automatically halted if a temperature above a predefined threshold is sensed, even if the user is still charging. In some instances, one or more error state may be detected where it may not be safe or optimal to charge. In such situations, a user may be instructed to stop charging or turning the crank. In some instances, even if the user is still turning the crank, but it is not safe or optimal to keep charging, the crank mechanism may be disconnected from the battery so that the rotational action by the user does not add charge to the battery.

The systems and methods provided herein may prevent overcharging of the battery. Overcharging of the battery may damage the battery and/or device or decrease battery life. When the battery has reached a threshold level of charge, one or more charging mechanisms may be disconnected. For instance, if the user is engaging the crank to charge the battery and the battery has reached a threshold level of charge, the crank may be disconnected from the battery so that further cranking by the user does not add further charge to the battery. Similarly, if the solar panels are providing energy, and the battery has reached a threshold level of charge, the solar panels may be disconnected from the battery so that they are no longer providing energy even if they are still collecting sunlight.

In some instances, multiple power generation systems, such as the crank and the solar panels may provide energy to the battery at the same time. Alternatively, only a single power generation system may provide energy to the battery at a given time. For example, if the crank is engaged, then the solar panels may not be providing energy to the battery. When the crank stops being engaged, the solar panels may provide energy to the battery. In some embodiments, if sufficient energy is provided by the solar panels, engaging the crank may not provide energy to the battery.

Described herein, are methods and systems for presenting educational content. In one embodiment of the disclosure, the user may receive an educational device as described elsewhere herein. In some embodiments, user may be required to register. The user may be required to provide information such as username or alias or pin number to own a user account. In some embodiments, a single user may use each device. In some embodiments, a plurality of users may have access to each device. Each user may have a separate account.

The educational content on each device may cover a range of K12 educational context. The context may include subjects taught in a standard twelve year primary education. The context may be specialized based on the need of different groups of users such as special need users. The context may be provided in different languages. The context may further be specialized or customized based on preferences such as but not limited to demographic preferences and cultural preferences. The context may be specialized based on primary educational systems other than K12 educational system. In some embodiments, special software or computer program may be provided based on the language that the context is presented in. In some cases, where access to wide area networks are limited, the content may be stored on devices such as a cartridge and be installed or inserted as a hardware on the educational device. The content of the device may include courses or material for teaching different skills to different groups of users. The content may include video and/or audio and/or texts. In some embodiments, the content may include entertainment material such as video games or other noneducational material. In some instances, educational material may include games that may motivate a user and/or teach skills.

In some embodiments, the user may be evaluated for educational level prior to being presented with the educational material. In some embodiments, the user may take one or a plurality of evaluation tests. In some instances, the user may be periodically or constantly evaluated as the user engages with the educational material. The user's level and progress may be evaluated as the user progresses through the educational material. The educational material presented to the user may be adjusted based on the user's level and/or progress.

Figure 5:
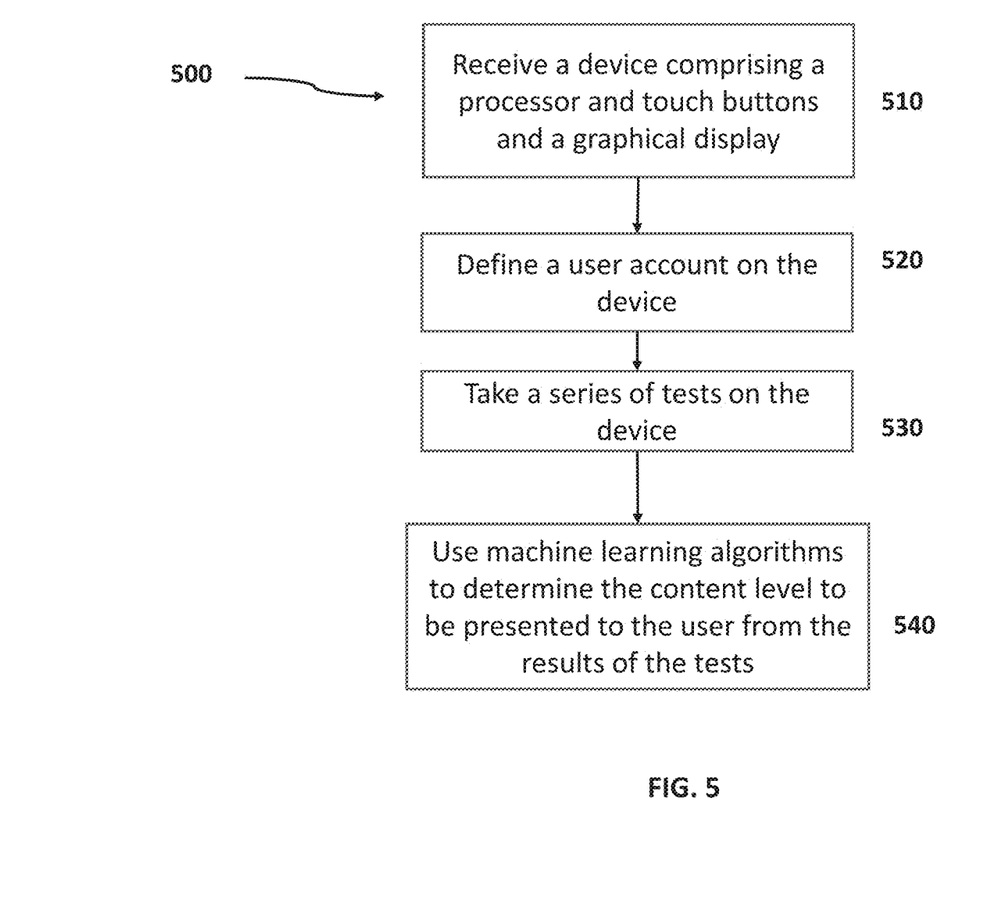
FIG. 5 shows an example workflow for a method of education level assessment according to some embodiments.

FIG. 5 shows an example flowchart of a method 500 of evaluation. As shown, in a step 530 the user may take a series of tests. The results of the tests may be fed to a machine learning algorithm, such as a neural network. In a step 540 machine learning techniques may be used to evaluate the educational content to be presented to the user from the results of the tests for example from the test scores. Other methods such as natural language processing (NLP) or latent semantic learning may also be utilized for assessment of the test results or scores. In the case of machine learning, the training dataset may be using user population historical data related to the test scores or simulated data. The training module may be configured to train a deep learning network for classification or prediction. The training module may comprise a supervised or unsupervised learning method such as, for example, SVM, random forests, clustering algorithms, gradient boosting, logistic regression, or decision trees. The machine learning algorithm, may comprise a neural network comprising a convolutional neural network (CNN), perceptron neural network, perceptron residual neural network, multilayer perceptron neural network, recurrent neural network (RNN), long short-term memory RNN (LSTM RNN), dilated CNN, fully connected neural networks, deep-learning self-attention networks, deep generative models or deep restricted Boltzmann machines.

The training may be done offline at a central processing unit or a server such as a remote server or a cloud server. The trained dataset may already be stored on a local storage of the educational device and ready to be used by a machine learning algorithm. The test scores may be analyzed and compared against the trained datasets to extract features and classify the level of required content for each user. The machine learning algorithm may also be used to determine the rate of learning for each user and/or the learning pattern of the user based on the test score analysis. Information related to each user may be transmitted to a mobile device as described elsewhere herein. The data may then be transferred to a server for updating the training dataset and further improving the algorithm. The training dataset may also include other data such as personal information of the users including gender, age, family education history or the living demographic.

In some embodiments, the tests may include different subjects. The result of each subject may be evaluated separately by the machine learning algorithm. The classification may be done for each subject separately. The user may be in different educational levels with regards to K12 subjects. Based on the results of the classification, the educational content may be customized for each user based on their needs, their learning rate and other factors. All the subjects may also be evaluated and classified as whole to classify a user's education level.

Different users may learn more efficiently through different presentation contexts such as visual presentation or audio presentation or textual presentation or a combination of different presentation orientations. Different learning modes may include different senses or activities that may be engaged by the user. For example, some users may learn most effectively pictorially, some may learn via words and text, some may learn via sounds or audio modes, some may learn via evaluation or tests. In some embodiments a user may learn more effectively when presented with a vertical orientation or a horizontal orientation of data. For example, a portrait orientation or a landscape orientation of a graphical display may be utilized based on the preferred mode. The device may be rotated to suit the desired orientation. The systems and methods provided herein may evaluate the most effective learning mode for each individual user and present material based on the effective learning mode.

A flowchart of a method 500 is shown in FIG. 5 for identifying the best learning method for the user. In a step 510, the user may receive an educational device. In a step 520, the user may define a user identification in order to be assigned a personal account. Machine learning methods may be utilized similar to what was explained for educational content level, to identify the best method of representation of content for each user. The user may take a series of tests, each test emphasizing one method of content presentation for example visual or audio or textual presentation, or emphasizing on a combination of presentations. The results of the tests such as the scores may be fed to the machine learning algorithm and be analyzed using the trained datasets. The training dataset may comprise historical data related to test results as well as simulated data. Different weights may be assigned to different types of tests and the features of the results may be extracted. The result may be classified into different categories and the optimal presentation method for each user may be extracted from the classifications.

Based on the results, the user may be presented with educational content that reflects the most effective learning mode for the individual user. This may differ based on different subjects. The user may be evaluated for each subject or topic to determine the most effective learning mode. The systems and methods provided herein may evaluate the user and/or perform diagnostics when the user starts the educational content. In some instances, the systems and methods provided herein may constantly or periodically evaluate the user's preferred learning mode and make adjustments to the educational content presented to the user as needed.

Figure 8:
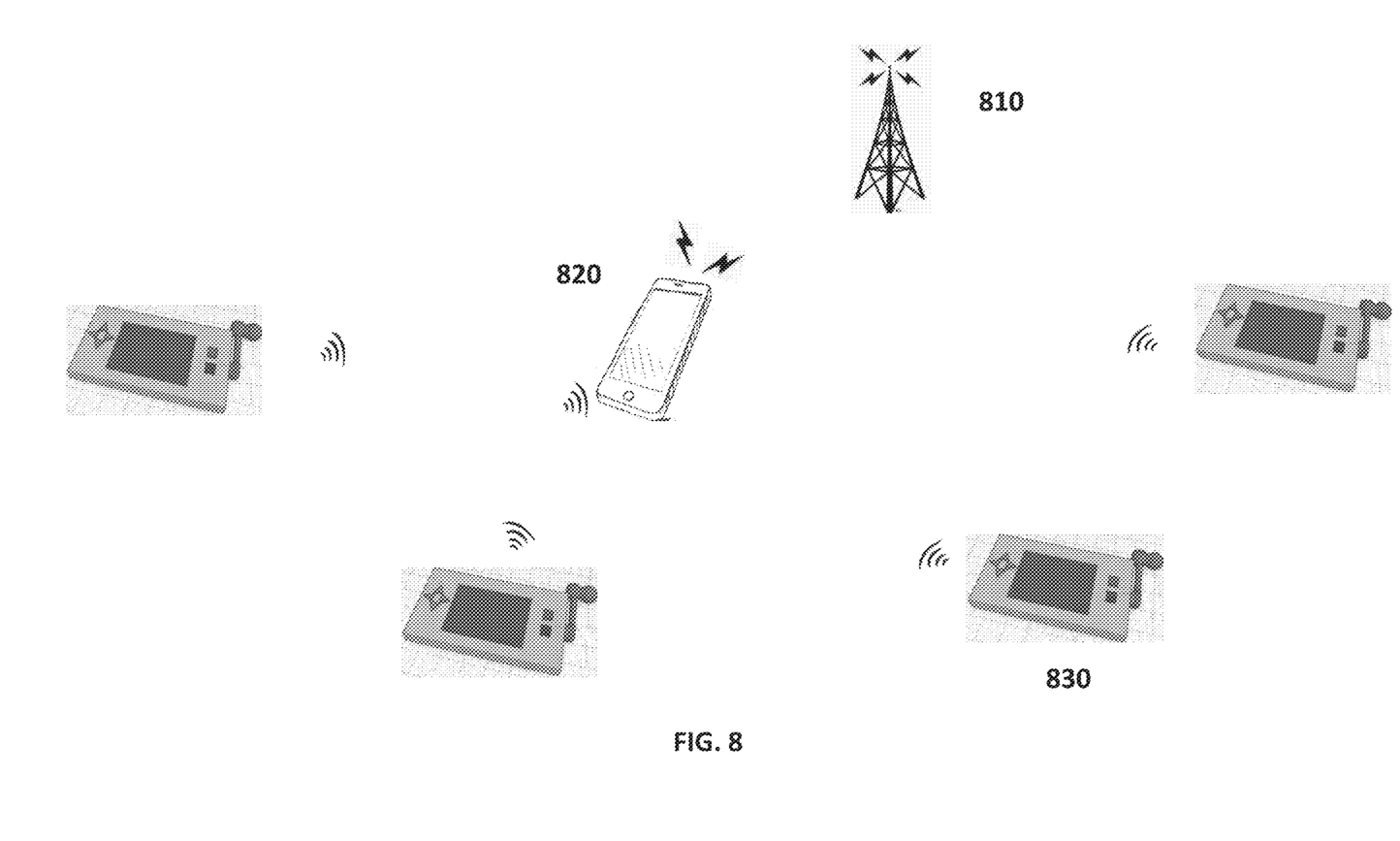
FIG. 8 shows an example of a communication system according to some embodiments.

FIG. 8 shows a system for transferring data to and from the educational device. Data transfer can include but is not limited to receiving software update packages or sending out user data or user progress data. As shown in the example of FIG. 8, the data package such as an update package for the educational software may be sent to a cellular network 810. The data may be sent to the cellular network from a server such as a local server or a remote server such as a cloud server. At the time of data transfer one or a plurality of educational devices may receive the data package form one or a plurality of mobile devices. The mobile device 820 can include but is not limited to smart phone or tablet or a computer. At a given time, one or a plurality of devices 830 can be communicating with the mobile device to receive the data packages. The one or a plurality of mobile devices may be communicating with the one or a plurality of educational devices through a Bluetooth communication protocol.

In some embodiments, there may be a wired connection between the mobile device and the educational device. The data may be transferred for example through a universal serial bus (USB) connection to and from the educational device.

In some instances, educational content may be delivered to a device via a physical medium. In some instances, devices may not be able to regularly connect to a network. In some instances, hardware, such as memory (e.g., memory stick, disc, cartridge, etc.) may be mailed to an individual with a device, which may connect (e.g., insert, attach) the hardware with the device to access to the educational content.

The present disclosure provides computer systems that are programmed to implement methods of the disclosure, including the control of hardware components, receiving and processing data, interface with a user, etc.

Figure 6:
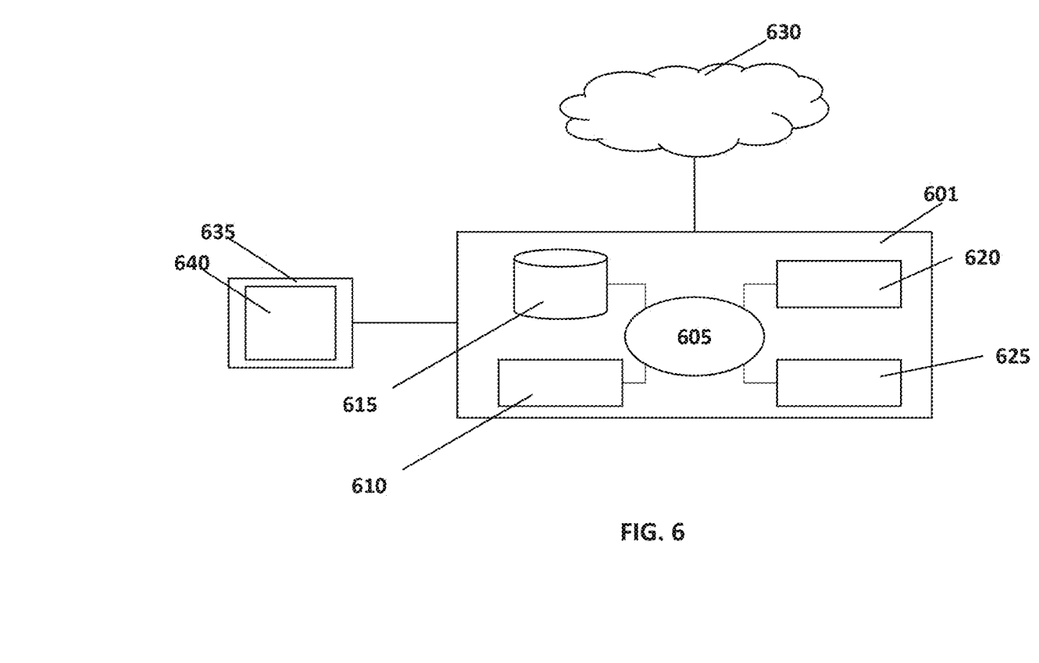
FIG. 6 shows an example computer system that is programmed or otherwise configured to implement methods provided herein.

FIG. 6 shows a computer system 601 that is programmed or otherwise configured to operate and/or control the educational device. The computer system 601 can regulate various aspects of educational device of the present disclosure. The computer system 601 can be an electronic device of a user or a computer system that is remotely located with respect to the electronic device. The electronic device can be a mobile electronic device.

The computer system 601 includes a central processing unit (CPU, also "processor" and "computer processor" herein) 605, which can be a single core or multi core processor, or a plurality of processors for parallel processing. The computer system 601 also includes memory or memory location 610 (e.g., random-access memory, read-only memory, flash memory), electronic storage unit 615 (e.g., hard disk), communication interface 620 (e.g., network adapter) for communicating with one or more other systems, and peripheral devices 625, such as cache, other memory, data storage and/or electronic display adapters. The memory 610, storage unit 615, interface 620 and peripheral devices 625 are in communication with the CPU 605 through a communication bus (solid lines), such as a motherboard. The storage unit 615 can be a data storage unit (or data repository) for storing data. The computer system 601 can be operatively coupled to a computer network ("network") 630 with the aid of the communication interface 620. The network 630 can be the Internet, an internet and/or extranet, or an intranet and/or extranet that is in communication with the Internet. The network 630 in some cases is a telecommunication and/or data network. The network 630 can include one or more computer servers, which can enable distributed computing, such as cloud computing. The network 630, in some cases with the aid of the computer system 601, can implement a peer-to-peer network, which may enable devices coupled to the computer system 601 to behave as a client or a server.

The CPU 605 can execute a sequence of machine-readable instructions, which can be embodied in a program or software. The instructions may be stored in a memory location, such as the memory 610. The instructions can be directed to the CPU 605, which can subsequently program or otherwise configure the CPU 605 to implement methods of the present disclosure. Examples of operations performed by the CPU 605 can include fetch, decode, execute, and writeback.

The CPU 605 can be part of a circuit, such as an integrated circuit. One or more other components of the system 601 can be included in the circuit. In some cases, the circuit is an application specific integrated circuit (ASIC).

The storage unit 615 can store files, such as drivers, libraries and saved programs. The storage unit 615 can store user data, e.g., user preferences and user programs. The computer system 601 in some cases can include one or more additional data storage units that are external to the computer system 601, such as located on a remote server that is in communication with the computer system 601 through an intranet or the Internet.

The computer system 601 can communicate with one or more remote computer systems through the network 1130. For instance, the computer system 601 can communicate with a remote computer system of a user (e.g., an educational device manager, an educational device user an educational device data acquirer, an educational device data scribe, etc.). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 601 via the network 630.

Methods as described herein can be implemented by way of machine (e.g., computer processor) executable code stored on an electronic storage location of the computer system 601, such as, for example, on the memory 610 or electronic storage unit 615. The machine executable or machine readable code can be provided in the form of software. During use, the code can be executed by the processor 605. In some cases, the code can be retrieved from the storage unit 615 and stored on the memory 610 for ready access by the processor 605. In some situations, the electronic storage unit 615 can be precluded, and machine-executable instructions are stored on memory 610.

The code can be pre-compiled and configured for use with a machine having a processor adapted to execute the code, or can be compiled during runtime. The code can be supplied in a programming language that can be selected to enable the code to execute in a pre-compiled or as-compiled fashion.

Aspects of the systems and methods provided herein, such as the computer system 601, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 601 can include or be in communication with an electronic display 635 that comprises a user interface (UI) 640 for providing, for example, a login screen for an administrator to access software programmed to control the educational device operation and functionality and/or for providing the operation status of an educational device. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 605. The algorithm can, for example, be component of software described elsewhere herein and may modulate device operating parameters, process and receive data, receive inputs from a user, output data to a user, etc.

Figure 7:
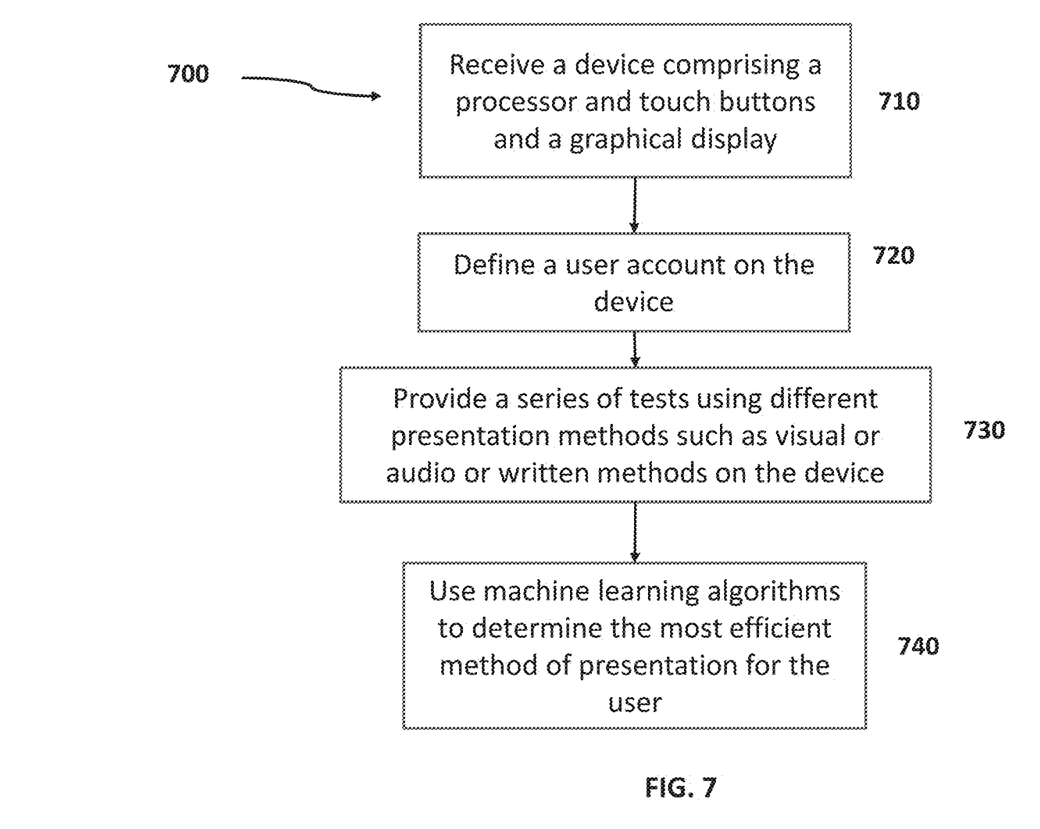
FIG. 7 shows an example workflow for a method of identifying the optimal content presentation method according to some embodiments.

FIG. 7 shows an example workflow for a method 700 of identifying the optimal content presentation method. In a step 710, a user may receive a device comprising a processor and touch buttons and a graphical display. In a step 720, a user account associated with the user may be defined on the device. In a step 730, a series of tests may be provided using different presentation methods such as visual or audio or written methods on the device. In a step 740, machine learning algorithms may be used to determine the most efficient method of presentation for the user.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A device used for educational purposes comprising:
    a first energy source comprising a mechanical crank integrated into the device, wherein the mechanical crank is configured to convert mechanical energy into electrical energy;
    a second energy source comprising a solar panel integrated into the device, wherein the solar panel is configured to convert solar energy into electrical energy;
    a graphical display;
    a processor configured to be powered by the electrical energy from the first energy source or the second energy source; and
    a plurality of push buttons configured to permit a user to interact with the device,
    wherein the electrical energy from the first energy source or the second energy source crank is used to charge a rechargeable battery of the device, and wherein a notification on the graphical display informs the user to (i) engage the mechanical crank or (ii) take the device to a sunlit area to charge the rechargeable battery when a state of charge of the rechargeable battery falls below a predefined threshold.

2. The device of claim 1, further comprising a memory configured to store educational content, wherein the educational content is configured to be displayed on the graphical display.

3. The device of claim 1, further comprising a communication interface configured to update the memory of the device based upon Bluetooth communications.

4. The device of claim 1, comprising multiple sides to which the mechanical crank may be attached to the device, based on a handedness of the user.

5. The device of claim 1, further comprising a visual indicator providing an indication of a level of charge of the rechargeable battery.

6. The device of claim 1, further comprising a power management unit configured to increase performance and reduce power consumption, based on voltage data from the rechargeable battery.

7. The device of claim 1, further comprising a halting mechanism configured to prevent further charging of the rechargeable battery while the mechanical crank is turned when the level of charge passes a predetermined threshold.

8. The device of claim 1, further comprising a halting mechanism configured to prevent further charging of the rechargeable battery when a temperature of the device exceeds a predetermined threshold.

9. The device of claim 1, wherein the mechanical crank and the solar panel are configured to provide energy to the rechargeable battery simultaneously while the mechanical crank is turned.

10. The device of claim 1, wherein the mechanical crank is configured to provide energy to the rechargeable battery and the solar panel is not configured to provide energy to the rechargeable battery while the mechanical crank is turned.

11. The device of claim 1, wherein the graphical display is configured to show remaining operational time for the device based upon the state of charge of the rechargeable battery.

12. The device of claim 1, wherein the processor is implemented with aid of a printed circuit board formed from a flame resistant 2 material.

13. The device of claim 1, wherein the printed circuit board is configured to be a heat sink for the device.

\* \* \* \* \*